United States Patent
Inkavesvaanit (10) Patent No.: US 9,797,432 B2
(45) Date of Patent: Oct. 24, 2017

(54) SYSTEMS AND METHODS FOR PROVIDING A QUICK-RELEASE CARABINER

(71) Applicant: Thanasit Inkavesvaanit, San Marino, CA (US)

(72) Inventor: Thanasit Inkavesvaanit, San Marino, CA (US)

( * ) Notice: Subject to any disclaimer, the term of this patent is extended or adjusted under 35 U.S.C. 154(b) by 0 days.

(21) Appl. No.: 14/719,947

(22) Filed: May 22, 2015

(65) Prior Publication Data

US 2016/0341239 A1    Nov. 24, 2016

(51) Int. Cl.
*F16B 45/02* (2006.01)

(52) U.S. Cl.
CPC .................... *F16B 45/02* (2013.01)

(58) Field of Classification Search
CPC .............. F16B 45/02; Y10T 24/45319; Y10T 24/45335; Y10T 24/4534; Y10T 24/45361; Y10T 24/45366; Y10T 24/45414; Y10T 29/49826; Y10T 29/49947
See application file for complete search history.

(56) References Cited

U.S. PATENT DOCUMENTS

| | | | | |
|---|---|---|---|---|
| 5,187,844 A * | 2/1993 | Simond | ................... | F16B 45/02 24/302 |
| 5,664,304 A * | 9/1997 | Tambornino | .............. | B66C 1/36 24/370 |
| 5,984,250 A * | 11/1999 | Connor | .............. | A47G 25/0607 24/599.1 |
| 6,421,888 B1 * | 7/2002 | Grenga | ................... | F16B 45/02 24/598.9 |
| D467,156 S * | 12/2002 | Bishop | .......................... | D8/356 |
| 6,601,274 B2 * | 8/2003 | Gartsbeyn | ............... | F16B 45/02 24/599.8 |
| 8,156,617 B2 * | 4/2012 | Schwappach | ........... | F16B 45/02 24/599.5 |
| 8,763,216 B2 * | 7/2014 | Codega | ................... | F16B 45/02 24/599.4 |
| D735,018 S * | 7/2015 | McEvilly | ....................... | D8/356 |
| 2003/0167608 A1 * | 9/2003 | Petzl | ....................... | F16B 45/02 24/600.2 |
| 2005/0011058 A1 * | 1/2005 | Simond | ..................... | B66C 1/36 24/599.1 |
| 2005/0193531 A1 * | 9/2005 | Chang | ..................... | F16B 45/02 24/600.2 |

(Continued)

*Primary Examiner* — David Upchurch
(74) *Attorney, Agent, or Firm* — Canady & Lortz LLP; Bradley K. Lortz (57) ABSTRACT

Systems and methods for providing a carabiner are discussed herein. While the carabiner can have any suitable component, in some cases, it includes a frame that extends between a first end and a second end, with the frame being defining an internal space, and with the frame defining a gap between the first and second end. Additionally, the carabiner includes a gate that is movably connected to the frame such that the gate is movable between a closed position (in which the gate closes the gap) and an opened position (in which it the gap is open). In some cases, a portion of the gate is configured to divide the internal space into a first and a second enclosure when the gate is in the closed position. Additionally, in some cases, the gate defines an aperture that receives the second end when the gate is closed. Other implementations are described.

20 Claims, 5 Drawing Sheets

(56) References Cited

U.S. PATENT DOCUMENTS

| | | | | |
|---|---|---|---|---|
| 2005/0229367 A1* | 10/2005 | Thompson | ............. | F16B 45/02 24/599.9 |
| 2008/0022497 A1* | 1/2008 | Thompson | ............. | F16B 45/02 24/598.1 |
| 2009/0183347 A1* | 7/2009 | Abels | ..................... | F16B 45/02 24/599.6 |
| 2011/0113604 A1* | 5/2011 | Chu | ....................... | F16B 45/02 24/601.5 |
| 2012/0317762 A1* | 12/2012 | Tardif | .................... | F16B 45/02 24/601.5 |

* cited by examiner

SYSTEMS AND METHODS FOR PROVIDING A QUICK-RELEASE CARABINER

BACKGROUND OF THE INVENTION

Field of the Invention

The present invention relates to carabiners. More particularly, some implementations of the present invention relate to systems and methods for providing a carabiner having two enclosures that are both selectively openable and closable with a single gate.

Background and Related Art

For over a hundred years, carabiners have been a valuable tool in many rope-intensive activities. Indeed, carabiners have become mainstays in several activities, such as climbing, rappelling, spelunking, sailing, rope rescue, construction, arboriculture, window washing, whitewater rescue, industrial rope work, and a wide variety of activities that involve using one or more carabiners to retain a rope in one more desired locations with respect to a user.

In addition to their utility with rope-intensive activities, carabiners have been, and are, regularly used to rapidly connect two or more items together and to rapidly disconnect such items from each other. For instance, carabiners are regularly used to selectively connect items (such as keys, keychains, water bottles, phones, tools, flashlights, multi-tools, accessories, and/or other items) to one or more other objects (such as a belt, belt loop, bag, backpack, zipper, harness, rope, MOLLE looping, cord, strap, attachment surface, jacket, and/or one or more other objects).

While the specific characteristics and components of carabiners can vary greatly, carabiners often comprise a metal loop with a spring-loaded gate that is configured to move to open and close the loop. Accordingly, carabiners are regularly operated by opening the gate to allow objects (such as a rope, strap, key ring, binding, hook, washer, etc.) to pass into and/or be removed from the loop.

Although carabiners may provide a variety of benefits, conventional carabiners are not necessarily without their shortcomings. In some examples of shortcomings that can be associated with conventional carabiners, some carabiners are relatively difficult to use and some are prone to allow ropes (or other objects) to undesirably slide between a first end (sometimes called a basket) and a second end (sometimes called a crotch) of such carabiners.

Thus, while a variety of carabiners currently exist, challenges still exist, including those listed above. Accordingly, it would be an improvement in the art to augment or even replace current techniques with other techniques.

SUMMARY OF THE INVENTION

The present invention relates to carabiners. More particularly, some implementations of the present invention relate to systems and methods for providing a carabiner having two enclosures that are both selectively and (in some cases) simultaneously openable and closable with a single gate. While the described carabiners can have any suitable component, in some cases, they includes a carabiner frame that extends between a first end and a second end of the frame, with the frame defining an internal space, and with the frame further defining a gap between its first and second ends. In some cases, the carabiner also includes a gate that is movably connected to the frame such that the gate is biased towards a closed position (in which the gate closes the gap) and such that the gate is movable to an opened position (in which it the gap is at least partially open). In some cases, a portion of the gate is also configured to divide the internal space within the frame into a first and a second enclosure when the gate is in the closed position.

With respect to the carabiner frame, the frame can be any suitable shape, including, without limitation, being substantially circular, elliptical, D-shaped, C-shaped, pear-shaped, asymmetrical, triangular, and/or any other suitable shape. Additionally, in some cases, the frame comprises a piece of material (e.g., metal, plastic, ceramic, etc.) that extends from the frame's first end to the frame's second end and that is bent (or otherwise formed) to form the internal space within the frame and to define the gap between the first and second ends of the frame.

With respect to the gate, the gate can include any suitable component that allows it to selectively open and close the gap between the frame's first and second ends, while being biased towards closing the gap. In this regard, some examples of suitable gates include any suitable solid gate, wire gate, straight gate, bent gate, screw gate, manual locking gate, automatic locking gate (dual stage, single stage, etc.), twist-lock gate, key-lock gate, spring gate, and/or any other suitable type of carabiner gate.

While the gate can be disposed in any suitable location on the frame that allows the gate to selectively open and close the gap in the frame, in some implementations (unlike some conventional carabiners in which the gate is pivotally attached to a second end of the carabiner) the described gate is attached to another portion of the frame. Indeed, in some implementations, the gate is movably attached to: a spine portion of the frame, a gate support member extending from the frame, a thickened portion of the frame, and/or any other suitable portion of the frame. More specifically, in some implementations, the gate is movably (e.g., pivotally, rotatably, bendably, resiliently, etc.) attached to a gate support member that extends from the frame's spine into the internal space defined by the frame.

In some implementations, the gate and/or the gate support member are configured to bisect the internal space defined within the frame such that when the gate is in the closed position, the internal space is separated into two discrete enclosures and such that when the gate is in the opened position, an object can be passed through the gap into either the first or the second enclosure. Accordingly, in some such implementations, the two enclosures are both selectively and simultaneously openable and closable as the gate moves between the opened position and the closed position.

In addition to the aforementioned characteristics, the described carabiner can have any other suitable characteristic that allows it to function as intended. Indeed, in some implementations, a front side of the gate (or, in some cases, a side of the gate that faces away from the frame's spine) defines a hole, recess, and/or other aperture that is sized and shaped to receive, abut with, and/or otherwise move into proximity with the second end of the frame when the gate is closed. In some other implementations, the frame is further configured to define two or more internal spaces and the carabiner has a separate gate for each internal space. In some such implementations, at least one of the gates is configured to bisect the internal space to which it corresponds into a first and second enclosure when the gate is closed.

While the methods and processes of the present invention may be particularly useful for carabiners that are configured for relatively light uses, those skilled in the art will appreciate that the described systems and methods can be used in a variety of different applications and in a variety of different areas of manufacture. For instance, in some implementations, the described systems and methods are configured to be used to provide carabiners that are manufactured and tested for load-bearing in safety-critical conditions, such as for use in mountain and rock climbing.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above-recited and other features and advantages of the present invention are obtained, a more particular description of the invention will be rendered by reference to specific embodiments thereof, which are illustrated in the appended drawings. Understanding that the drawings are not necessarily drawn to scale or in proper proportion, and that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to carabiners. More particularly, some embodiments of the present invention relate to systems and methods for providing a carabiner having two enclosures that are both selectively openable and closable with a single gate. While the carabiner can have any suitable component, in some cases, it includes a carabiner frame that extends between a first end and a second end of the frame, with the frame defining an internal space, and with the frame defining a gap between its first and second ends. Additionally, in some embodiments, the carabiner includes a gate that is movably connected to the frame such that the gate is movable between a closed position (in which the gate closes the gap) and an opened position (in which it the gap is at least partially open or unclosed). In some cases, a portion of the gate is configured to divide the internal space into a first and a second enclosure when the gate is in the closed position.

In the disclosure and in the claims, the term carabiner (and variations thereof) may be used to refer to a loop (of any suitable shape) that defines a gap in the loop and that has a gate that is configured to close the gap in the loop. While the gate, in some embodiments, is freely moveable between an open and closed position (and vice versa), in other embodiments, the gate is biased towards the closed position.

In general (and as mentioned above), some embodiments of the described systems and methods relate to a carabiner having at least two enclosures that are both selectively openable and closable with a single gate. While the described carabiner can comprise any suitable component or characteristic, FIG. 1 shows that, in at least some embodiments, the carabiner 10 comprises a frame 15 having a first end 20 and a second end 25, wherein the frame defines an internal space 30 as well as a gap 35 between the frame's first and second ends.

Figure 1:
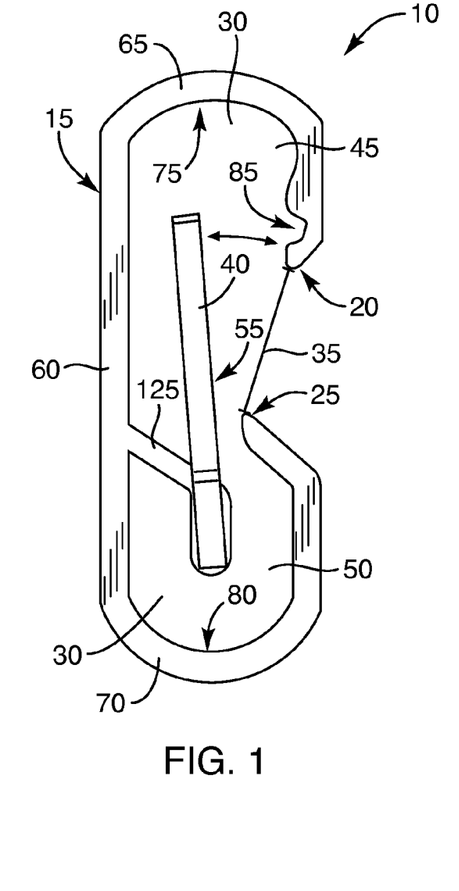
FIG. 1 illustrates an elevation view of a carabiner in an open configuration in accordance with a representative embodiment.
Figure 2:
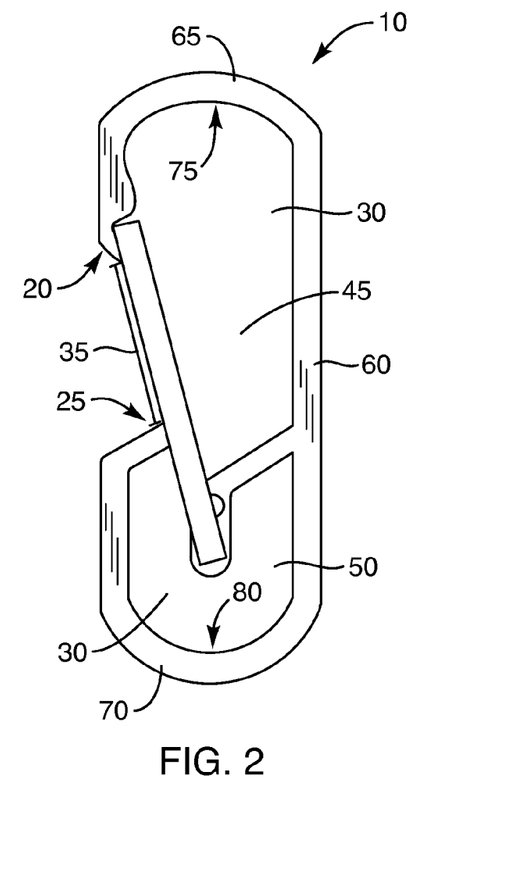
FIG. 2 illustrates an elevation view of the carabiner in a closed configuration in accordance with a representative embodiment.
Figure 3:
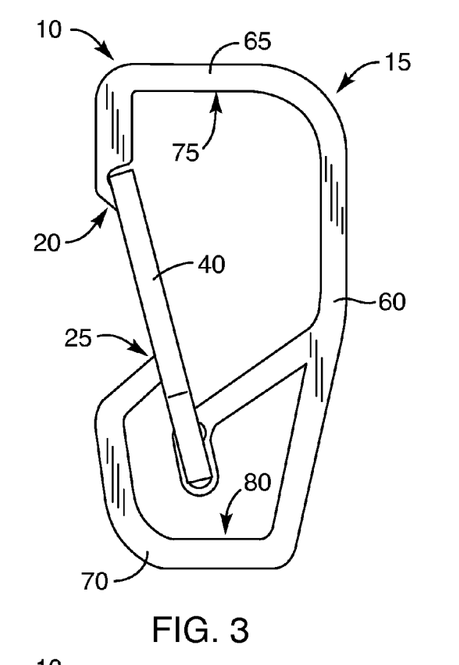
FIGS. 3-6 each illustrate an elevation view of the carabiner in accordance with a different representative embodiment.
Figure 4:
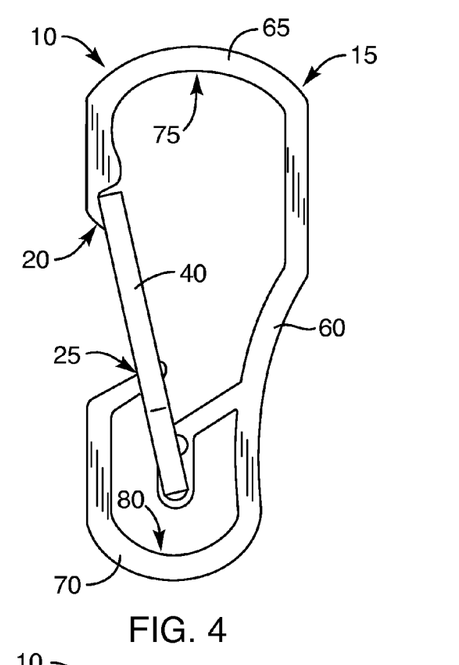
Figure 5:
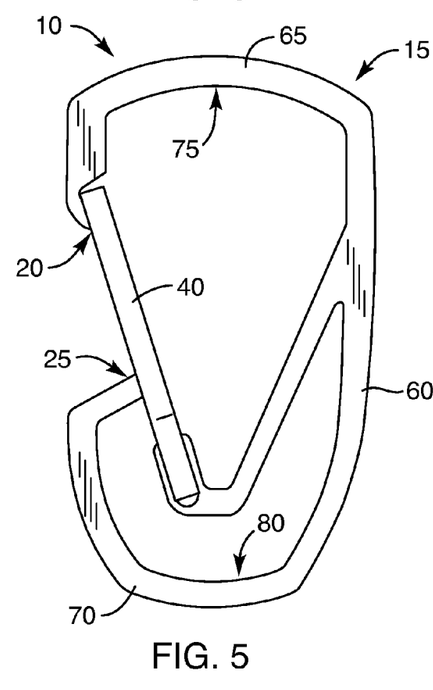
Figure 6:
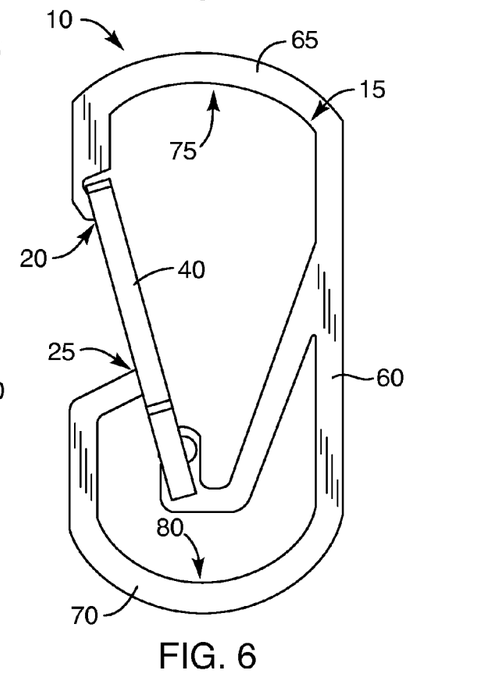

Additionally, FIG. 1 shows that, in some embodiments, the carabiner 10 further comprises a gate 40 that is attached to the frame 15 such that the gate is movable between an opened position (in which a portion of the gate is moved such that the gap 35 is not completely blocked by the gate; see e.g., FIG. 1) and a closed position (in which a portion of the gate moves between the frame's first 20 and second 25 ends to close (or occlude) the gap 35; see e.g., FIG. 2). Additionally, while FIG. 2 shows that, in some embodiments, when the gate 40 is closed, the gate divides the internal space 30 into a first 45 and a second 50 enclosure, FIG. 1 shows that when the gate 40 is open an object (not shown) can be passed between a first (e.g., front) side 55 of the gate and either of the frame's first 20 or second 25 ends to be disposed, respectively, in either the first 45 or the second 50 enclosure.

With respect to the frame 15, the frame can have any suitable shape that defines an internal space 30 and that has a gap 35 that can be opened and closed with the gate 40. Indeed, in some embodiments, the frame comprises (or otherwise resembles) a shape selected from an oval, a circle, a square, an ellipse, a triangle, a D-shape, a C-shape, a G-shape, a symmetrical shape, an asymmetrical shape, an offset-D shape, a pear shape, an HMS carabiner shape, an oblong shape, an irregular shape, a novelty shape (e.g., a heart-shape, a FIG. 8, an S-shape, a bone shape, a horse shape, a fish shape, a dog shape, a cat shape, a butterfly shape, an animal shape, a tree shape, a star shape, a house shape, a car shape, a key shape, a guitar shape, a mushroom shape, a flower shape, a leaf shape, a fruit shape, a crown shape, a bottle shape, a shoe shape, a letter shape, a cross shape, and/or any other suitable novelty shape), and/or any other suitable shape. Nevertheless, FIGS. 1-2 shows that, in some embodiments, the frame 15 has somewhat of a G-shaped appearance.

The frame 15 can include any suitable component that allows it to function as intended, Some examples of suitable components include a spine, the first end 20, the second 25, and a gate support member 125 (or gate connection or gate attachment member).

With respect to the spine, the spine can have any suitable characteristic that allows the carabiner 10 to function as intended. Indeed, while the spine can be curved, straight, decorative, ergonomically shaped, and/or have any other suitable shape, FIGS. 3-6 respectively illustrate some embodiments in which the spine 60 comprises a portion that is substantially bent, curved, rounded, and straight. Additionally, FIGS. 3-6 show that, in some embodiments, a first portion 65 and a second portion 70 of the frame 15 extend from the spine 60 to form a first end portion 75 (sometimes called a basket) and a second end portion 80 (sometimes called a crotch) of the carabiner 10.

With regards to the first 20 and second 25 ends of the frame 15, in some embodiments, the first end comprises a nose, or a first terminal end of the carabiner that is configured to contact the gate 40 to close the gap 35 (and/or the first enclosure 45) in the frame. Additionally, in some embodiments, the frames second end comprises another portion of the carabiner (e.g., a second terminal end of the frame) that is configured to abut with, receive, and/or otherwise interact with the gate in such a manner that when the gate is in the closed position, the gate and the second end form and/or close the second enclosure 50 and such that when the gate is in the opened position, the second enclosure is also open such than an object can pass between the gate's first side 55 and the frame's second end 25.

The frame's first 20 and second 25 ends can have any suitable characteristic that allows the carabiner 10 to function in any manner described herein. In one example, one or both of the frame's ends can comprise one or more notches, grooves, threaded engagements, magnets, catches, mating components, apertures, and/or other characteristics that allow a portion of the gate 40 to contact, receive, couple, and/or mate with such ends. By way of non-limiting illustration, FIG. 1 shows an embodiment in which the first end 20 comprises a notch 85 that is configured to engage a recess, groove, and/or other aperture 86 in the gate 40 (as discussed below).

In another example of a suitable characteristic, the first 20 and second 25 ends of the frame 15 can extend in any suitable direction, including, without limitation, in a direction that: is substantially parallel with a portion of the spine, is at an angle to a portion of the spine, extends towards a portion of the spine, extends away from the spine, and/or in any other suitable manner that allows the gate 40 to close and form two enclosures (e.g., the first 45 and second 50 enclosures). By way of non-limiting illustration, FIG. 7 (and FIG. 1) show at least one embodiment in which the first end 20 extends substantially parallel to a portion of the spine 60, while a portion of the second end 25 extends towards the spine 60.

Figure 7:
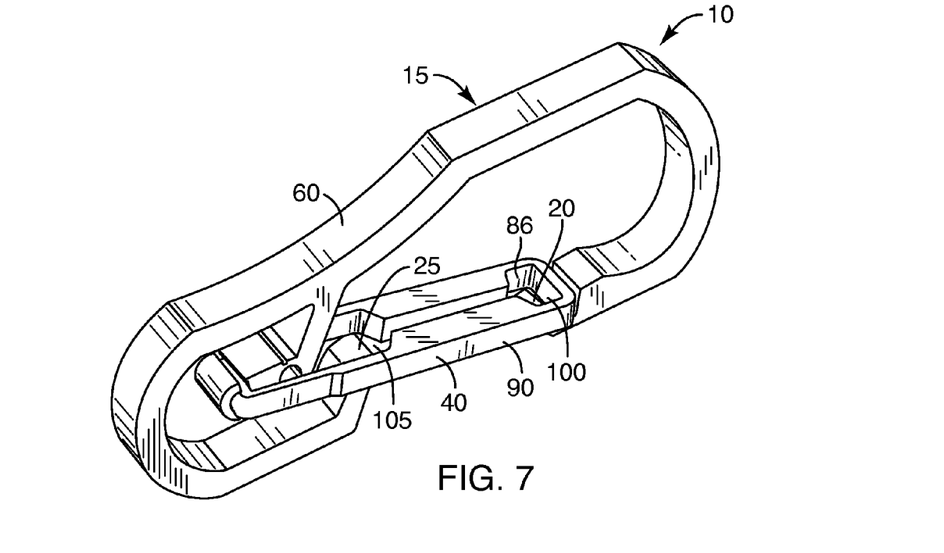
FIG. 7 illustrates a perspective view of the carabiner in accordance with a representative embodiment.
Figure 8:
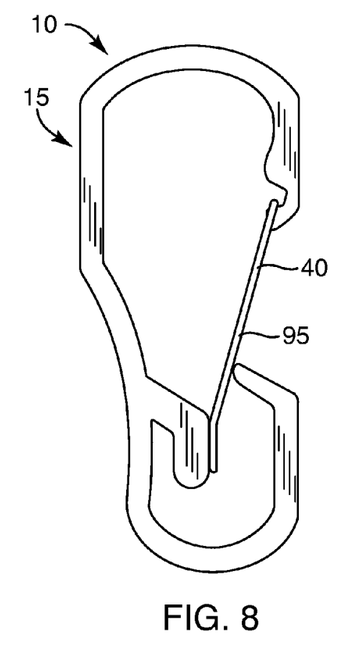
FIGS. 8-9 each illustrate an elevation view of a different representative embodiment of the carabiner.
Figure 9:
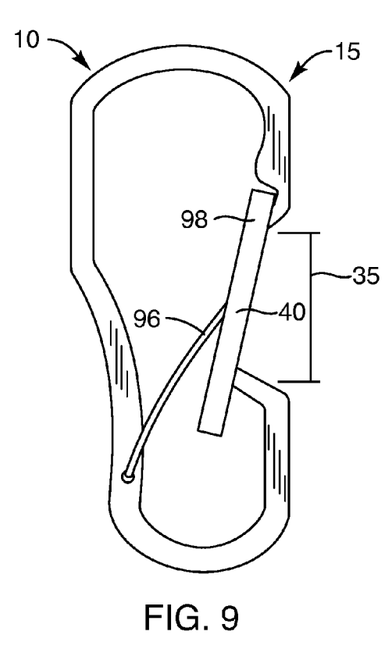

With regards to the gate 40, the gate can comprise any suitable characteristic that allows it to open such that an object can be passed between a first (e.g., front) side 55 of the gate and the first 20 and/or second 25 ends of the frame 15 to be moved into and/or out of the first 45 and/or second 50 enclosures. Some examples of suitable gates include, but are not limited to, any suitable: straight gate, bent gate, wire gate, double gate, grimlock carabiner gate, leaf spring gate, spring gate, solid gate, screw gate, screw-lock gate, manual locking gate, automatic locking gate (e.g., dual stage, single stage, etc.), twist-lock gate, key-lock gate, magnetic gate, gate with a locking sleeve, and/or any other suitable type of carabiner gate. By way of non-limiting illustration, FIG. 7 shows an embodiment in which the gate 40 comprises a torsion spring 90, that attaches to the carabiner 10 in two locations in such a manner that the gate is biased towards the frame's first 20 and second 25 ends. Additionally, FIGS. 8-9 show some embodiments in which the gate 40 respectively comprises a leaf spring 95 and a spring 96 coupled with a piece 98 that is configured to block the gap 35 in the frame 15.

Although, in some embodiments, the gate 40 is not biased towards the closed position, in other embodiments, it is. In such latter embodiments the gate can comprise any suitable biasing mechanism, including, without limitation, one or more torsion springs, coil springs, leaf springs, helical springs, tension springs, compression springs, resilient members, and/or other suitable mechanisms that are configured to bias the gate. Indeed, as mentioned above, FIG. 7 shows an embodiment in which the gate 40 comprises a torsion spring 90, while FIGS. 8-9 embodiments in which the gate comprise a leaf spring 95 and/or another suitable spring 96.

Figure 10:
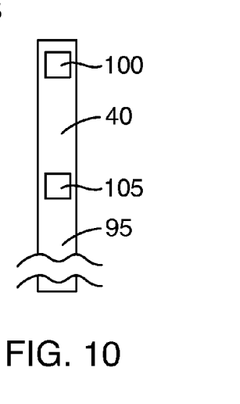
FIG. 10 illustrates an elevation view of a leaf spring gate in accordance with a representative embodiment.

In addition to the aforementioned components, the gate 40 can comprise any other suitable component and/or characteristic that allows it to function as intended. For instance, while some embodiments of the gate are configured to abut the frame's first 20 and/or second 25 ends when the gate is in the closed position, in some other embodiments, the gate comprises one or more recesses, grooves, holes, and/or other apertures that are configured to receive a portion of the frame's first and/or second ends. By way of non-limiting illustration, FIGS. 7 and 10 illustrate some embodiments in which the gate 40 comprises a first 100 and a second 105 aperture that are configured to respectively receive the frame's first 20 and second 25 ends.

Figure 11:
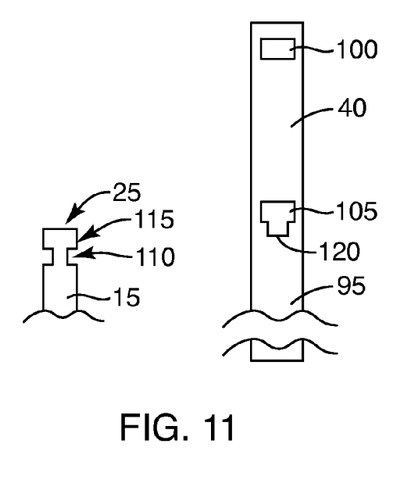
FIG. 11 illustrates an elevation view of the leaf spring gate and a second end of the carabiner in accordance with a representative embodiment.

In another example of a suitable characteristic of the gate 40, some embodiments of the gate are configured to capture the frame's first 20 and/or second 25 ends when the gate is closed and the carabiner 10 is stretched (e.g., the carabiner is deformed due to the application of excessive force). In such embodiments, the gate and frame 15 can comprise any suitable characteristics that allow them to catch each other when the carabiner 10 is in the closed position and its structural integrity is compromised. Some examples of such characteristics include one or more notches and corresponding catches, locking mechanisms or gates with locking mechanisms (as mentioned above), and/or other suitable components. By way of illustration, FIG. 11 shows an embodiment in which the frame's second end 25 comprises a neck 110 with an enlarged end member 115. Moreover, FIG. 11 shows that in some embodiments the gate 40 comprises a second opening 105 that is configured to receive the enlarged end member and that the second opening further defines a notch 120 that is configured to receive the neck 110 such that when the carabiner 10 is deformed (e.g., longitudinally) so that the neck enters the notch, the enlarged end member is prevented from passing through the notch when the gate 40 in the closed position. Accordingly, in some embodiments, the gate is keyed or otherwise configured to capture the second end and prevent the second enclosure 50 from bending open.

Figure 12:
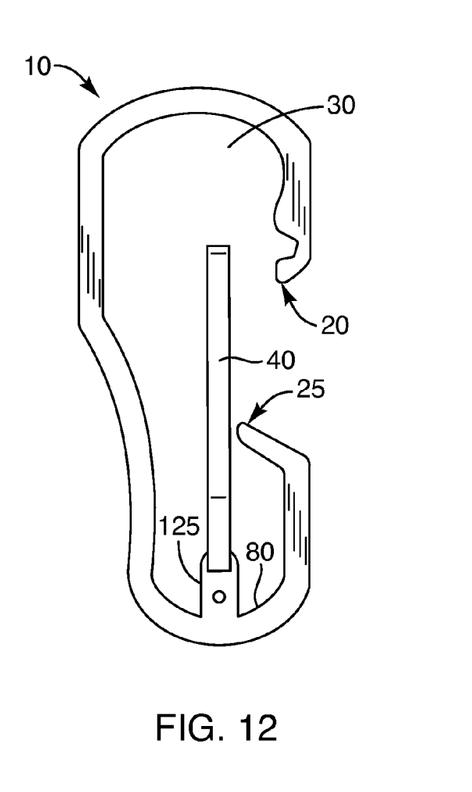
FIGS. 12-15 each illustrate an elevation view of the carabiner in accordance with a different representative embodiment.
Figure 13:
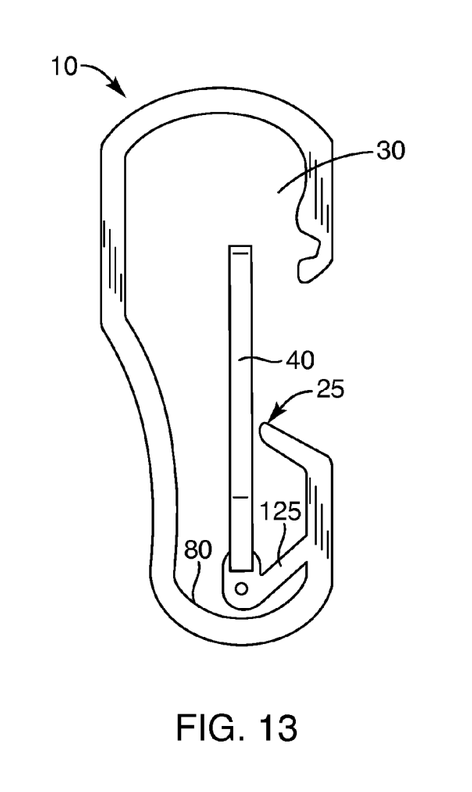

While the gate 40 can be disposed in any suitable location on the frame 15 that allows the gate to selectively open and close the gap 35 in the frame, in some embodiments (unlike some conventional carabiners that have a gate that is pivotally attached to a second end (or a second nose) of the carabiner), some embodiments of the described gate are attached to another portion of the frame. Indeed, in some embodiments, the gate is movably attached to: a spine 60 of the frame, a first end portion 75 (e.g., a basket), a second end portion 80 (e.g., a crotch), the frame's first end 20, the frame's second end 25, a gate support member extending from the frame, and/or from any other suitable portion (or gate connection) of the frame 15. By way of non-limiting illustration, FIGS. 1, 12, and 13 respectively show some embodiments in which the gate 40 is movably (e.g., pivotally, rotatably, bendably, and/or otherwise) attached to a projection, a thickened portion, and/or any other suitable gate support member 125 that is disposed on and/or extends from the spine 60, the second end portion 80 of the frame 15, and a portion of the carabiner between the send end portion 80 and the second end 25 of the frame 15.

Thus, in some embodiments (as mentioned), the gate 40 and/or the gate support member 125 are configured to bisect the internal space 30 defined within the frame 15 such that when the gate is in the closed position, the internal space is separated into two discrete enclosures and such that when the gate is in the opened position, an object (not shown) can be passed through the gap 35 in the frame into either the first or the second enclosure. Accordingly, in some such embodiments, the two enclosures (e.g., the first 45 and second 50 enclosures) are both selectively and simultaneously openable and closable as the gate moves between the opened position and the closed position.

Figure 14:
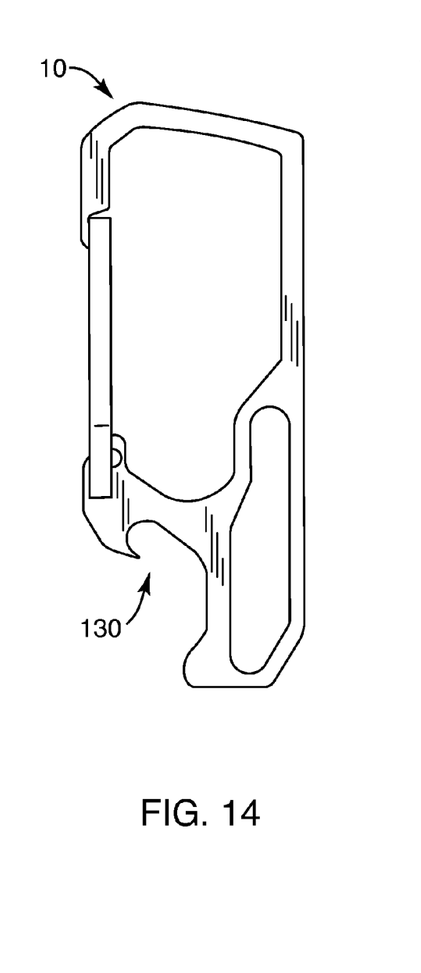

In addition to the aforementioned features, the described carabiner 10 can be modified in any suitable manner that allows it to function as intended. In one example, the carabiner is configured to comprise a can opener and/or a bottle opener. By way of nonlimiting illustration, FIG. 14 illustrates one embodiment in which the carabiner 10 comprises a bottle opener 130.

Figure 15:
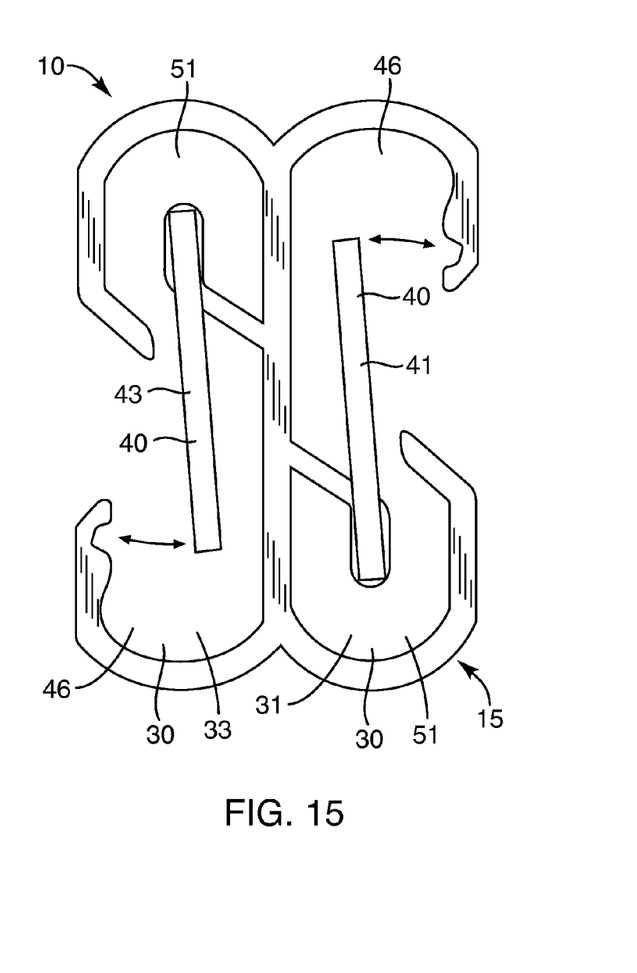

In another example, the carabiner comprises two or more internal spaces 30, with each internal space being configured to define two enclosures when a gate 40 corresponding to each internal space is in the closed position. By way of non-limiting illustration, FIG. 15 shows an embodiment in which the carabiner 10 comprise a frame 15 that defines a first 31 and a second 33 internal space, and wherein a first 41 and a second 43 gate are configured to divide its corresponding internal space into a first 46 and a second 51 enclosure.

The described carabiner 10 can comprise any suitable materials that allow it to function as intended. Indeed, in some embodiments, the carabiner comprises one or more metals (e.g., steel, aluminum, titanium, copper, brass, bronze, tungsten, cobalt, cobalt chromium, zinc, zinc alloy, iron, stainless steel, a metal alloy, and/or any other suitable metal) plastics (e.g., ABS plastic, nylon, elastomer, engineered plastic, and/or any other suitable plastic), polymers (e.g., polyethylene, polycarbonate, polyvinylchloride, and/or any other suitable polymers), ceramics, types of fiberglass, synthetic materials, woods, natural materials, and/or other suitable materials. In some embodiments, however, the carabiner comprises one or more metals, such as titanium, brass, copper, steel, and/or aluminum.

The described carabiner 10 can also be made in any suitable manner. In this regard, some non-limiting examples of methods for making the described carabiner include, one or more techniques comprising extruding, stamping, casting, machining, cutting, etching, additive manufacturing, bending, folding, drilling, welding, melting, shaping, molding, connecting various pieces with one or more fasteners (e.g., adhesives, mechanical fasteners, frictional fasteners, pins, rivets, hinges, crimps, clips, brads, screws, nails, pegs, springs, etc.), melting pieces together, EDM cutting, machining, finishing, grinding, buffing, polishing, coating, tumbling, anodizing, and/or any other suitable method that allows the described carabiner to be formed and to perform its intended functions.

In addition to the aforementioned features, the described carabiner 10 can have several additional features. In one example, as some embodiments of the carabiner define a first 45 and a second 50 enclosure that are separated when the gate 40 is in the closed position, in some such embodiments, the carabiner is configured to prevent objects from passing between the first and the second enclosures when the gate is closed.

In another example, some embodiments of the carabiner 10 allow an object to readily pass into and/or be removed from the first 45 and/or second 50 enclosures when the gate is open. In other words, in some embodiments, a user does not need to move an object, such as a key ring, past a second, or back surface, of the gate 40 to dispose the object at the second end portion 80 of the carabiner.

Thus, the present invention relates to carabiners. More particularly, some implementations of the present invention relate to systems and methods for providing a carabiner having two enclosures that are both selectively openable and closable with a single gate. While the carabiner can have any suitable component, in some cases, it includes a frame that extends between a first end and a second end, with the frame being defining an internal space, and with the frame defining a gap between the first and second end. Additionally, the carabiner includes a gate that is movably connected to the frame such that the gate is movable between a closed position (in which the gate closes the gap) and an opened position (in which it the gap is open). In some cases, a portion of the gate is configured to divide the internal space into a first and a second enclosure when the gate is in the closed position. Additionally, in some cases, the gate defines an aperture that receives the second end when the gate is closed.

The present invention may be embodied in other specific forms without departing from its spirit or essential characteristics. The described embodiments, examples, and illustrations are to be considered in all respects only as illustrative and not restrictive. The scope of the invention is, therefore, indicated by the appended claims rather than by the foregoing description. All changes that come within the meaning and range of equivalency of the claims are to be embraced within their scope. In addition, as the terms on, disposed on, attached to, connected to, coupled to, etc. are used herein, one object (e.g., a material, element, structure, member, etc.) can be on, disposed on, attached to, connected to, or coupled to another object—regardless of whether the one object is directly on, attached, connected, or coupled to the other object, or whether there are one or more intervening objects between the one object and the other object. Also, directions (e.g., front back, on top of, below, above, top, bottom, side, up, down, under, over, upper, lower, lateral, etc.), if provided, are relative and provided solely by way of example and for ease of illustration and discussion and not by way of limitation. Where reference is made to a list of elements (e.g., elements a, b, c), such reference is intended to include any one of the listed elements by itself, any combination of less than all of the listed elements, and/or a combination of all of the listed elements. Furthermore, as used herein, the terms a, an, and one may each be interchangeable with the terms at least one and one or more.

What is claimed is:
1. A carabiner, comprising:
　a frame having:
　　a first end;
　　a second end, wherein the frame extends between, and defines a gap between, the first end and the second end, and wherein the frame is shaped to define an internal space; and
　　a gate support member unmovably affixed to and extending from the frame into the internal space of the frame; and a gate pivotally attached to the gate support member, wherein the gate is configured to selectively move between a closed position in which the gate closes the gap and an opened position in which the gap is open, such that when the gate is in the closed position the carabiner defines a first enclosure and a separate second enclosure, and such that when the gate is opened, an object is able to enter either the first enclosure or the second enclosure through the gap.

2. The carabiner of claim 1, wherein the gate is biased towards the first end and the second end.

3. The carabiner of claim 1, wherein the gate support member extends from a spine of the frame.

4. The carabiner of claim 1, wherein the gate support member extends from a crotch portion of the frame.

5. The carabiner of claim 1, wherein the gate support member extends from a basket portion of the frame.

6. The carabiner of claim 1, wherein the gate defines an aperture that is configured to receive the second end of the frame when the gate is in the closed position.

7. The carabiner of claim 6, wherein the second end of the frame is keyed to the aperture such that the second end of the frame is configured to become captured in the aperture when a length of the second enclosure is stretched.

8. The carabiner of claim 1, wherein the second end of the frame is configured to contact a portion of the gate when the gate is in the closed position and to be separated from the gate when the gate is in the open position.

9. The carabiner of claim 1, wherein a portion of the gate is configured to divide the internal space into a first and a second enclosure when the gate is in the closed position.

10. The carabiner of claim 9 wherein the gate comprises a front side and a back side, wherein the back side is disposed closer to the spine than is the front side, and wherein the carabiner is configured such that when the gate is in the opened position, an object can pass directly between either (a) the first end of the frame and the front side of the gate into the first enclosure and (b) the second end of the frame and the front side of the gate into the second enclosure.

11. The carabiner of claim 1, wherein the gate comprises at least one of (a) a leaf spring and (b) a wire gate that is configured to expand between the first and second ends of the frame.

12. The carabiner of claim 1, wherein the frame comprises a spine and the first end extends from the spine and the second end extends from the spine.

13. The carabiner of claim 1, wherein the gate support member and the gate are configured to split the internal space into the first and the second enclosure when the gate is in the closed position and to open both the first enclosure and the second enclosure when the gate is in the opened position.

14. The carabiner of claim 12, wherein the gate comprises a front side and a back side, wherein the back side is disposed closer to spine than the front side, wherein the carabiner is configured such that when the gate is in the opened position, an object can pass directly between either (a) the first end of the frame and the front side of the gate into the first enclosure or (b) the second end of the frame and the front side of the gate into the second enclosure.

15. The carabiner of claim 1, wherein the gate is configured to span the gap between the first end and the second end in the closed position and the gate is moved away from both the first end and the second end in the open position.

16. The carabiner of claim 1, wherein when the gate is in the opened position, an object can pass directly between either (a) the first end of the frame and the gate into the first enclosure or (b) the second end of the frame and the gate into the second enclosure.

17. The carabiner of claim 16, wherein the gate comprises a front side and a back side and when the gate is in the opened position the object can pass directly between either (a) the first end of the frame and the front side of the gate into the first enclosure or (b) the second end of the frame and the front side of the gate into the second enclosure.

18. The carabiner of claim 1, wherein a spring biases the gate in the closed position.

19. The carabiner of claim 1, wherein the gate comprises a leaf spring.

20. The carabiner of claim 1, wherein the gate comprises a spring and a piece.

* * * * *